July 7, 1964 G. W. BOYER 3,140,062

TAPE TRANSPORT SYSTEM

Original Filed Feb. 1, 1960

United States Patent Office 3,140,062 Patented July 7, 1964

3,140,062
TAPE TRANSPORT SYSTEM

George Wesley Boyer, Covina, Calif., assignor to Consolidated Electrodynamics Corporation, Pasadena, Calif., a corporation of California Continuation of application Ser. No. 204,917, June 25, 1962, which is a division of application Ser. No. 6,022, Feb. 1, 1960, now Patent No. 3,106,361. This application July 1, 1963, Ser. No. 295,269
4 Claims. (Cl. 242—76)

Figure 1:
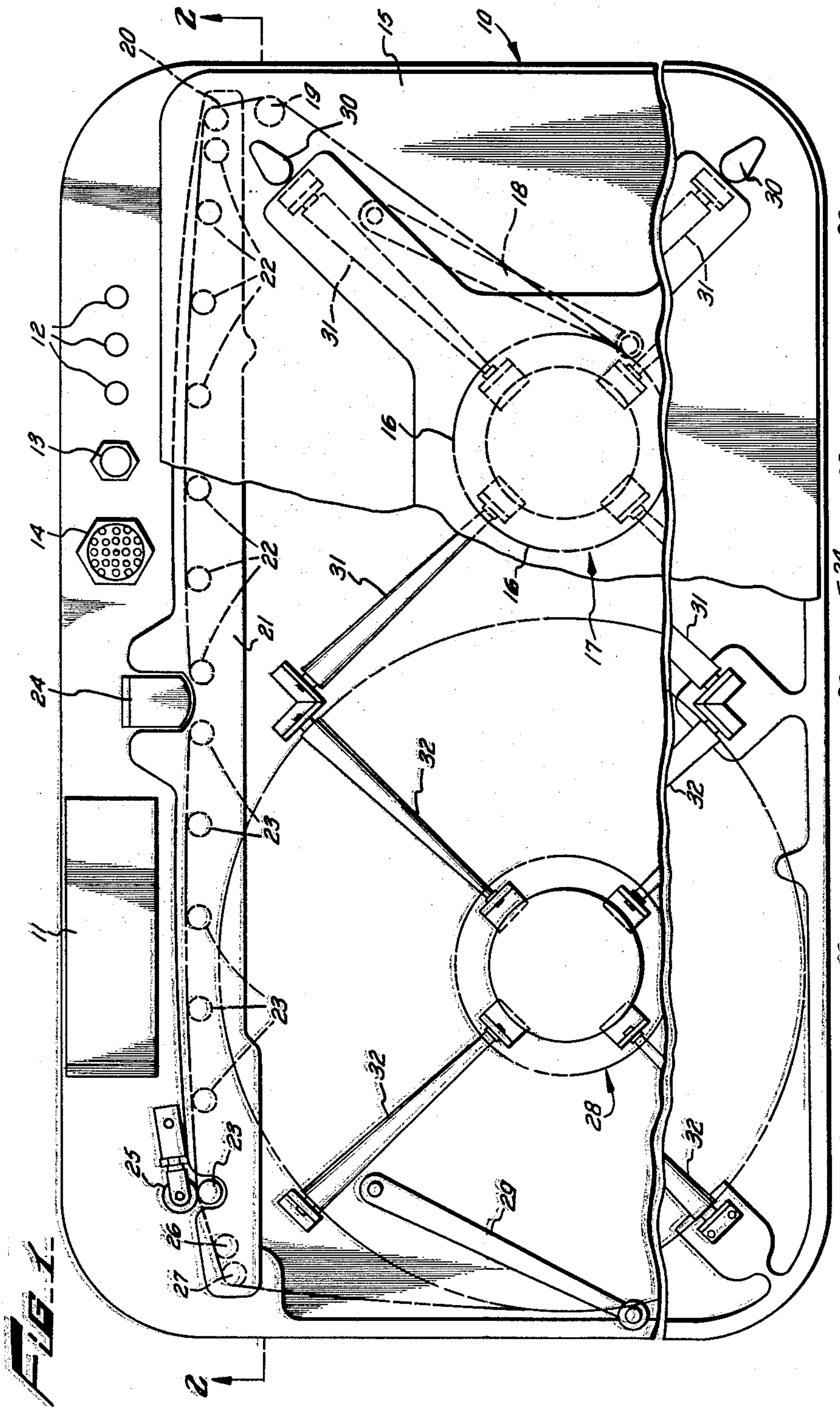

This invention relates to tape transport systems and consists of an improvement in the guidance of the tape.

This application is a continuation of copending application Serial No. 204,917, filed June 25, 1962, now abandoned which is a divisional application of the copending application of George Wesley Boyer, Serial No. 6,022, filed February 1, 1960, now Patent No. 3,106,361 entitled Tape Transport System.

The use of magnetic tapes to record information is well known. In conventional systems the tape transport system consists of two rotatable hubs, each containing a reel adapted to hold the magnetic tape. The tape is unwound from one reel and passed adjacent a magnetic transducer for either reading or recording information on the tape. The tape is then wound on the other reel by various conventional means which provide for the rotation of the hub to which the reel is attached.

In order to provide for the rapid recording or reading of digital information in particular, the tape may be passed adjacent the magnetic transducer at a comparatively high rate of speed. Utilizing a high rate of speed enables a large number of information bits to be recorded or read in a comparatively short period of time. The magnetic tape used in such systems is not of a uniform width, but varies slightly in width about a nominal width. For example, magnetic tape which is nominally one inch in width has a standard width deviation of +0, —.004 inch. In conventional systems, as the tape is passed adjacent the magnetic transducer, the tape may be slightly skewed either upwards or downwards from a path perpendicular to the magnetic transducer due to these width variations. The binary bits comprising a word are recorded as magnetized spots across the width of the magnetic tape in one system of recording. In order to insure that all bits in the same word are read simultaneously and only a single word is read at a single instant, the length of a magnetized section on the tape corresponding to a bit is made comparatively long. Therefore, even though the tape may pass the transducer in a skewed position, the length of the bit and the separation between words serially recorded on the tape compensates for the skewing. However, this procedure, which necessitates a high tape transport speed in order to process a large quantity of information in a short period of time, requires that a large quantity of tape be utilized in conjunction with a comparatively small amount of information.

In certain applications for tape transport mechanisms, for example in airborne utilizations, space is at a premium. Therefore, it is necessary in conventional practice, in order to provide a sufficient amount of magnetic tape to process the information required, to utilize a low tape transport speed, short bit length and narrow word spacing. These processes result ordinarily in unsatisfactory performance of the mechanism, due to the skewing of the tape.

According to the present invention a novel guidance system is utilized to greatly reduce the skew of the tape as it passes the magnetic transducer. By utilizing the novel guidance mechanism, greatly increased information storage capacity is achieved for a given length of tape, as compared to conventional practice.

In order to eliminate the major portion of the skew of the tape when passing the magnetic transducer, a long guidance track is utilized to enclose the edges of the tape. This long guidance track averages out the irregularities in tape width as the tape passes adjacent the transducer. The long guidance track consists of two parallel guide plates connected together by a series of posts. The posts are disposed so as to form two interesecting arcs, the point of interesection being adjacent the magnetic transducer. The arcuate configuration is utilized to maintain continuous contact between the posts and the tape. This contact insures that the tape irregularities are averaged out by the parallel guide plates.

Figure 2:
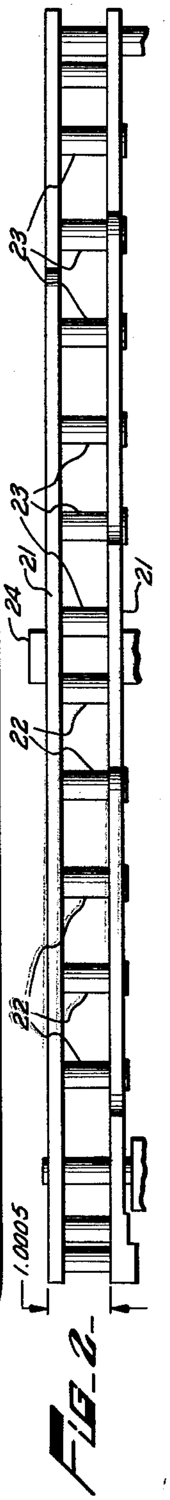

The invention may be more readily understood by referring to the accompanying drawings in which:

FIG. 1 is a plan view, partially cut away, of a tape transport mechanism utilizing the invention; and FIG. 2 is an elevation of the tape guidance system.

Referring now to FIG. 1 there is shown a tape recorder 10. The tape recorder 10 has a control panel 11, three indicator lights 12, a signal input terminal 13 and a remote control terminal 14. The tape recorder 10 has a top cover 15 which is partially broken away in FIG. 1.

Magnetic tape, indicated by the doted line 16, is contained on a first hub 17. A pivoted arm 18 rides against the tape 16 about the hub 17 so as to retain the tape in position. The tape 16 is threaded past a guide roller 19 and a metering roller 20. The metering roller 20 is positioned between two parallel plates 21, only one of which is shown in FIG. 1.

A first group of posts 22 is positioned between the parallel guide plates 21 in the form of an arc. A second group of posts 23 is also positioned between the parallel guide plates 21 in the form of an arc. These two arcs intersect at a magnetic transducer 24. A pinch roller 25 rides against the tape 16 at one of the posts 23 to provide the necessary tension on the tape 16 as it is transported. After passing the pinch roller 25, the tape 16 passes a take-off guide post 26 and take-off roller 27 positioned between the parallel plates 21. The tape 16 is then wound on to a second hub 28. A pivoted guide arm 29 maintains the level position of the tape as it is wound on the hub 28.

The cover 15 is held in position on the tape recorder 10 by means of snap lock fittings 30, only two of which are shown in FIG. 1.

Four pairs of tapered rollers 31, only one roller of a pair being shown in FIG. 1, are disposed about the first hub 17 so as to extend radially therefrom. Four pairs of tapered rollers 32 are similarly disposed about the second hub 28. The tapered rollers 31 and 32 are frustoconical in configuration and are positioned so that the adjacent surfaces of the pairs of rollers lie in two parallel planes perpendicular to the hub associated therewith.

FIG. 2 is an elevation of a tape guidance system according to the invention. The pair of guidance plates 21 are spaced apart by the arcuately disposed first series of posts 22 and second series of posts 23. The magnetic transducer 24 is positioned adjacent the intersection of the two arcs. The spacing between the two plates is dependent upon the width of the magnetic tape to be guided and the width tolerance of the tape. The two plates 21 should be spaced sufficiently far apart that the tape will pass freely therebetween. However, the spacing should not be such as to permit merely lateral movement of the tape. For example, in guiding the previously described tape of nominal one inch width, appropriate spacing between the two plates 21 is 1.0005 inches, —0, +.0003.

The length over which the tape is to be guided is primarily dependent upon the permissible skew for the particular system, assuming the guide plates have been disposed as just described. In the practice of the invention the minimum length over which the tape must be guided is equal to one-half of the quotient of the width deviation of the tape divided by the maximum permissible skew. This is the minimum tape guidance or travel length necessary, and in practice it is perferable to provide for a somewhat greater length of guidance. For example, when using the one inch tape already referred to, if it is desired to maintain a maximum skew of one hundred microinches, the minimum tape guidance length is 20 inches. However, in practice it is perferable to make this tape guidance length at least 25 inches.

In such a system the support posts 22 and 23 are preferably disposed in arcs of circles whose radii are at least twice as great as the tape guidance length. For example, in the system just described for guiding one inch tape, the disposition of the posts 22 and the posts 23, each, in an arc of a circle of one hundred inch radius provides for satisfactory guidance contact between the support posts and the tape while not introducing so great a curvature of the support posts alignment as to appropriate space therefore unnecessarily.

The essence of the invention in the tape guidance system lies in the use of the extremely long guidance track to reduce the skewing of the tape adjacent the magnetic transducer. For certain applications or tolerances of tape, modifications of these design equations may be found to be advantageous. It is to be understood that these design equations embody the concept of the invention and are intended to be primarily a guide in the practice thereof, rather than to constitute an unnecessary limitation.

I claim:

1. Apparatus for increasing the maximum usable packing density of information recorded on magnetic tape by minimizing the skewing thereof caused by tape width variations, comprising a pair of parallel guide plates, the spacing between which is the minimum spacing which permits the tape to pass freely therebetween, and a plurality of posts disposed between the parallel plates so as to form two arcs which converge symmetrically to intersect a magnetic transducer positioned therebetween, said tape travel length between said parallel guide plates being much greater than the width of the tape.

2. Apparatus according to claim 1 wherein each of the two arcs is of a circle whose radius is at least twice as great as the tape travel length between the parallel plates.

3. Apparatus according to claim 2 wherein the tape travel length between the parallel plates is a distance in inches equal to at least one-half of the quotient of the tape width deviation in inches divided by the maximum permissible skew in inches.

4. A magnetic tape transport comprising a magnetic transducer head, means for moving the tape past the head, said tape moving means including means for maintaining the tape under tension as it moves past the head, and fixed guiding means positioned adjacent the head and engaging one surface of the tape along the path of movement of the tape, the guiding means forming the tape into a substantially arcuate shape when the tape is directed under tension across the guiding means, the arcuate path extending along a length of the tape which is greater than the width of the tape, and means defining at least one flat planar surface extending along the boundary of the arcuate path defining means for engaging and guiding the one edge of the tape.

References Cited in the file of this patent

UNITED STATES PATENTS

| | | |
|---|---|---|
| 1,694,111 | Wellman | Dec. 4, 1928 |
| 2,669,398 | Olson | Feb. 16, 1954 |
| 2,988,294 | Neff | June 13, 1961 |